United States Patent
Chung et al.

(10) Patent No.: US 11,145,047 B2
(45) Date of Patent: Oct. 12, 2021

(54) METHOD FOR SYNTHESIZING IMAGE AND AN ELECTRONIC DEVICE USING THE SAME

(71) Applicant: Samsung Electronics Co., Ltd., Suwon-si (KR)

(72) Inventors: Jun-sung Chung, Seoul (KR); Sun-hwa Kim, Seoul (KR); Jae-young Lee, Hwaseong-si (KR); Gi-ppeum Choi, Suwon-si (KR); Sun Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/026,687

(22) Filed: Jul. 3, 2018

(65) Prior Publication Data

US 2018/0330491 A1    Nov. 15, 2018

Related U.S. Application Data

(63) Continuation of application No. 15/401,739, filed on Jan. 9, 2017, now Pat. No. 10,043,260.

(30) Foreign Application Priority Data

Apr. 1, 2016  (KR) ......................... 10-2016-0040268

(51) Int. Cl.
*G06T 11/00* (2006.01)
*G06T 7/00* (2017.01)
(Continued)

(52) U.S. Cl.
CPC ............ *G06T 7/0004* (2013.01); *G06F 16/00* (2019.01); *G06F 16/583* (2019.01); *G06T 11/00* (2013.01);
(Continued)

(58) Field of Classification Search
CPC ...... G06T 11/60; G06T 17/00; G06Q 30/0643
(Continued)

(56) References Cited

U.S. PATENT DOCUMENTS

| 8,274,523 | B2 | 9/2012 | Ptucha et al. |
| 2003/0184815 | A1 | 10/2003 | Shiki et al. |

(Continued)

FOREIGN PATENT DOCUMENTS

| CN | 1427293 A | 7/2003 |
| CN | 102473318 A | 5/2015 |

(Continued)

OTHER PUBLICATIONS

Masahiro Sekine et al, "Virtual Fitting by Single-Shot Body Shape Estimation", Proceedings of the 5th International Conference on 3D Body Scanning Technologies, Lugano, Switzerland, Oct. 21, 2014, pp. 406-413, XP055316827, Ascona, Switzerland.

(Continued)

*Primary Examiner* — Thomas J Lett
(74) *Attorney, Agent, or Firm* — Jefferson IP Law, LLP

(57) ABSTRACT

An apparatus and method for synthesizing an image and an electronic apparatus using the method are provided. The electronic apparatus includes a memory that stores pictures, a transceiver that communicates with an external server, a display that detects a user interaction, and a processor that reads pictures from the memory. The processor first selects pictures based on a weighted value, determines first attribute information and second attribute information from the first selected pictures, stores the first attribute information and the second attribute information in a database form, second selects at least one picture from among the first selected pictures based on the first attribute information, the second attribute information and user context information, controls the transceiver to receive a product image corresponding to (Continued)

the second selected picture from the external server, and creates a composite image by synthesizing the second selected picture and the product image.

20 Claims, 12 Drawing Sheets

(51) Int. Cl.
 *G06F 16/00* (2019.01)
 *G06F 16/583* (2019.01)
 *G06T 11/60* (2006.01)
 *G06T 7/194* (2017.01)
(52) U.S. Cl.
 CPC .............. *G06T 11/60* (2013.01); *G06T 7/194* (2017.01); *G06T 2200/24* (2013.01); *G06T 2207/20221* (2013.01); *G06T 2207/30108* (2013.01)
(58) Field of Classification Search
 USPC ......................................................... 345/632
 See application file for complete search history.

(56) References Cited

U.S. PATENT DOCUMENTS

| | | | |
|---|---|---|---|
| 2008/0059578 A1* | 3/2008 | Albertson | ............... G06F 3/017 709/204 |
| 2011/0025709 A1 | 2/2011 | Ptucha et al. | |
| 2012/0127327 A1 | 5/2012 | You | |
| 2012/0136755 A1 | 5/2012 | Yang | |
| 2013/0182963 A1 | 7/2013 | Cok | |
| 2014/0201023 A1 | 1/2014 | Tang | |
| 2014/0180873 A1 | 6/2014 | Rijhwani | |
| 2015/0206292 A1* | 7/2015 | Masuko | ............... H04N 9/3185 705/27.2 |
| 2016/0063588 A1 | 3/2016 | Gadre et al. | |
| 2016/0210602 A1* | 7/2016 | Siddique | ............ G06Q 20/0453 |
| 2017/0032219 A1 | 2/2017 | Zhang et al. | |
| 2017/0178213 A1 | 6/2017 | Wang et al. | |
| 2018/0124609 A1* | 5/2018 | Ciano | ..................... G06F 21/32 |

FOREIGN PATENT DOCUMENTS

| | | |
|---|---|---|
| JP | 2008-065413 A | 3/2008 |
| JP | 2009-088729 A | 4/2009 |
| KR | 10-2010-0026981 A | 3/2010 |
| KR | 10-2011-0054175 A | 5/2011 |
| KR | 10-1151428 B1 | 6/2012 |
| KR | 10-2012-0078290 A | 7/2012 |
| KR | 10-2015-0044520 A | 4/2015 |
| WO | 01/11886 A1 | 2/2001 |
| WO | 2015/129987 A1 | 9/2015 |

OTHER PUBLICATIONS

Andres Traumann et al, "A new retexturing method for virtual fitting room using Kinect 2 camera", 2015 IEEE Conference on Computer Vision and Pattern Recognition Workshops (CVPRW), IEEE, 7 Jun. 7, 2015, pp. 75-79, XP032795623.
Extended European Search Report dated Sep. 25, 2018 issued in European Application No. 17775656.6.
European Office Action dated Nov. 4, 2019, issued in a counterpart European application No. 17775656.6-1217 / 3366038.
Result of Consultation dated May 8, 2020, issued in European Application No. 17775656.6.
Decision to Refuse dated Jun. 4, 2020, issued in European Application No. 17775656.6.
Chinese Office Action dated Jul. 7, 2020, issued in Chinese Patent Application No. 201780017436.3.
Chinese Office Action dated Jan. 19, 2021, issued in Chinese Application No. 201780017436.3.
Chinese Rejection Decision dated Jun. 8, 2021, issued in Chinese Patent Application No. 201780017436.3.

* cited by examiner

FIG. 4
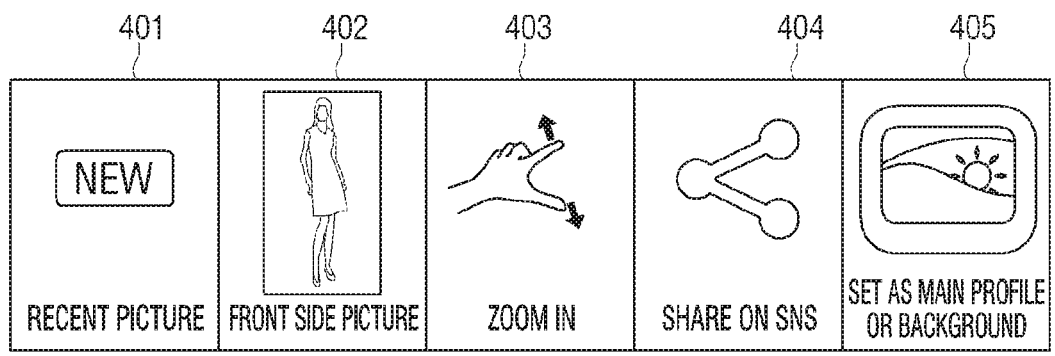
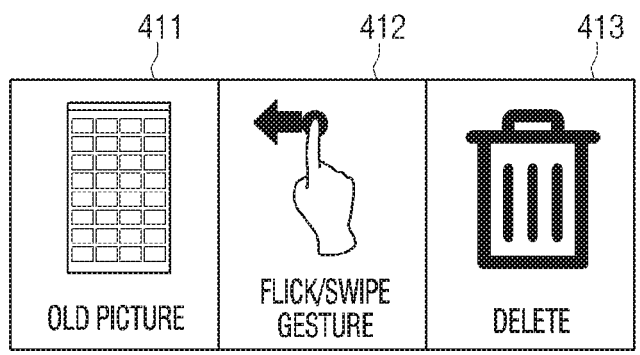

FIG. 5
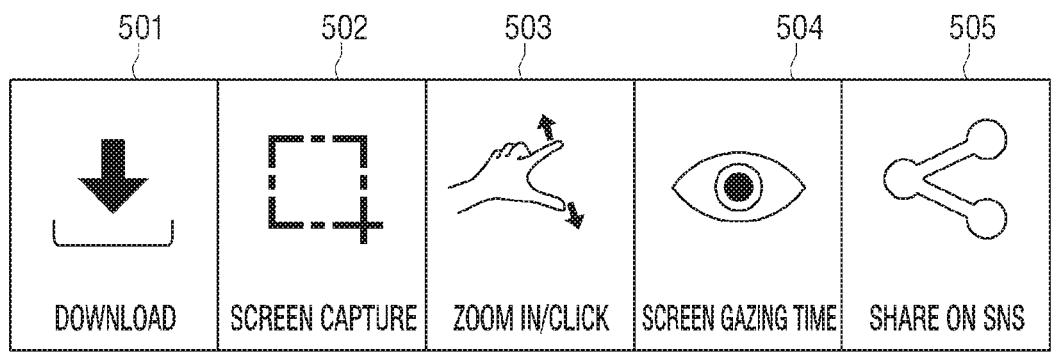
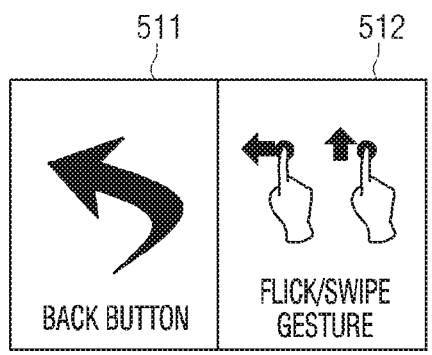

FIG. 8
| | | \| | ATTRIBUTE OF BACKGROUND 831 | | | |
|---|---|---|---|---|---|---|
| | | BACKGROUND | WEATHER | SCHEDULE | CONTEXT | OTHER |
| ATTRIBUTE OF CLOTHES | STYLE | BEACH+ BLUE | CLEAR+ DRESS SHIRT | WEDDING+ FORMAL SUIT | OUT FOR DRINKING+ CASUAL | |
| | COLOR | MOUNTAIN+ B1 | CLEAR+ BLUE | AT MEETING+ WHITE | MOUNTAIN CLIMBING+ YELLOW | |
| | BRAND | | | WEDDING+ B2 | MOUNTAIN CLIMBING+ B2 | |
| | SIZE | | CLEAR+ M | MEETING+ M | PLAYING BASKETBALL+ L | |
| | OTHER | | | | | |
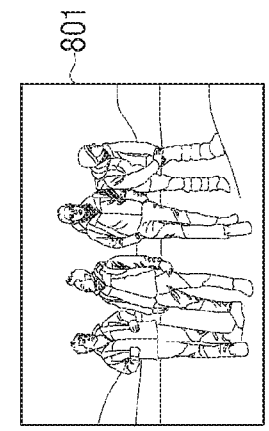
801
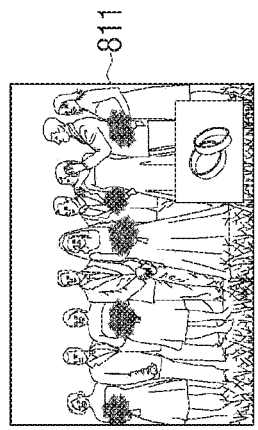
811
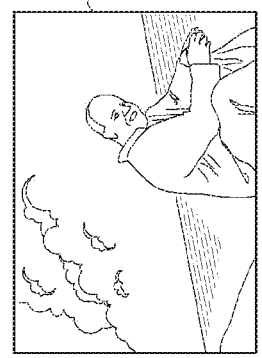
821

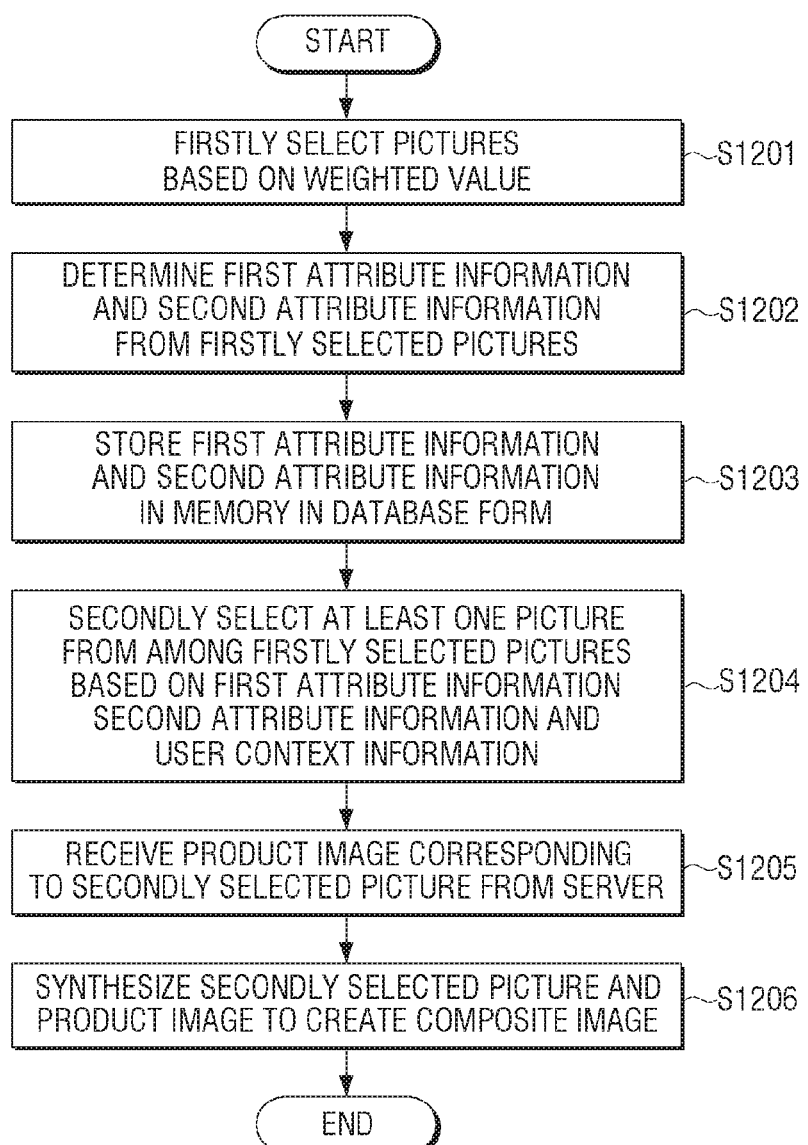

METHOD FOR SYNTHESIZING IMAGE AND AN ELECTRONIC DEVICE USING THE SAME

CROSS-REFERENCE TO RELATED APPLICATION(S)

This application is a continuation application of prior application Ser. No. 15/401,739, filed on Jan. 9, 2017, and was based on and claimed priority under 35 U.S.C. § 119(a) of a Korean patent application number 10-2016-0040268, filed on Apr. 1, 2016 in the Korean Intellectual Property Office, the disclosure of which is incorporated by reference herein in its entirety.

TECHNICAL FIELD

The present disclosure relates to a method and system for providing a virtual clothes wearing service. More particularly, the present disclosure relates to an electronic apparatus to synthesize a picture including a user with a product image and provide the synthesized image to a user terminal apparatus or a large flat display (LFD).

BACKGROUND

Advancement of computer and communication technology has enabled an electronic apparatus to have a small size and include various functions. In particular, the electronic apparatus may have a camera to create an image, and transmit the created image to a server in a remote place through a wireless communication function.

Meanwhile, a user may use various purchasing methods to purchase a product such as clothing or accessories via offline or online. By using such methods, the user makes a decision to purchase clothes or accessories by looking at a product worn by another entity, such as an Avatar, or a model, etc. In this case, the user is confronted with an unexpected result, and it is inconvenient for the user that he or she cannot wear the actual clothes and accessories. Also, user purchased clothes and accessories may not fit changed season and environment, bringing about various problems.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect the present disclosure is to provide a method and apparatus for generating an image in which a user selects a picture from among the previously-taken pictures and the selected picture is synthesized with clothes or accessories to be purchased by the user, and providing the same.

In accordance with an aspect of the present disclosure, a method for generating a composite image of an electronic apparatus is provided. The method includes first selecting at least one picture based on a weighted value, determining first attribute information and second attribute information based on the first selected at least one picture, storing the first attribute information and the second attribute information in a database form, second selecting at least one picture from among the first selected at least one picture based on the first attribute information, the second attribute information and user context information, receiving a product image corresponding to the second selected at least one picture from a server, and generating a composite image by synthesizing the second selected at least one picture with the product image. The weighted value may be determined based on a date and/or time on which a picture is created. Alternatively, the weighted value is determined based on a shape of an object included in the picture. Alternatively, the weighted value may be determined based on whether a picture is shared. Alternatively, the weighted value may be determined based on a user interaction. The user interaction may be detected while a picture is displayed on a screen. The weighted value may be increased in response to the user interaction being a zoom-in gesture. The first attribute information may be information on an object included in a picture. The second attribute information may be information on a background of a picture. The user context information may include position information of a user.

In accordance with another aspect of the present disclosure, an electronic apparatus is provided. The electronic apparatus includes a memory configured to store a plurality of pictures, a transceiver that communicates with an external server, a display that detects a user interaction, and a processor that is configured to read pictures from the memory. The processor is further configured to first select at least one picture based on a weighted value, determine first attribute information and second attribute information from the first selected at least one picture, store the first attribute information and the second attribute information in a database form, second select at least one picture from among the first selected at least one picture based on the first attribute information, the second attribute information and user context information, control the transceiver to receive a product image corresponding to the second selected picture from the external server, and create a composite image by synthesizing the second selected at least one picture and the product image. The weighted value may be determined based on a date and/or time on which a picture among the plurality of pictures was created. The weighted value may be determined based on a shape of an object included in a picture. The weighted value may be determined based on whether a picture is shared. The weighted value may be determined based on a user interaction. The user interaction may be detected while a picture is displayed on a screen. The electronic apparatus may increase the weighted value in response to the user interaction being a zoom-in gesture. The first attribute information may be information on an object included in a picture. The second attribute information may be information on a background of a picture. The user context information may include position information of a user.

In accordance with another aspect of the present disclosure, an electronic apparatus is provided. The electronic apparatus includes a memory configured to store a plurality of pictures, a display that detects a user interaction, and a processor. The electronic apparatus reads the plurality of pictures from the memory, first selects at least one picture based on a weighted value, determines first attribute information and second attribute information from the first selected at least one picture, stores the first attribute information and the second attribute information in a database form, second selects at least one picture from among the first selected at least one picture based on the first attribute information, the second attribute information and user context information, controls the transceiver to receive a product image corresponding to the second selected at least one picture from a server, and creates a composite image by synthesizing the second selected at least one picture with the product image, thereby enabling the user to see or visualize himself or herself wearing the actual product.

In accordance with another aspect of the present disclosure, an apparatus for synthesizing an image is provided. The apparatus includes a display, at least one processor, and at least one memory storing one or more computer programs configured to be executed by the at least one processor. The one or more computer programs including instructions for, first selecting at least one picture among a plurality of pictures based on a weighted value, determining first attribute information and second attribute information from the first selected at least one picture, second selecting at least one picture among the first selected at least one picture based on at least one of the first attribute information, the second attribute information and user context information, controlling the transceiver to receive a product image corresponding to the second selected at least one picture from an external server, and creating a composite image by synthesizing the second selected at least one picture and the product image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a view explaining a process of selecting a plurality of pictures stored in the electronic apparatus according to various embodiments of the present disclosure;

FIG. 5 is a view explaining a process of selecting, by an electronic apparatus, a picture received from a server according to various embodiments of the present disclosure;

FIG. 8 is a view illustrating an example of extracting, from a selected picture, attribute information of clothes included in the picture and attribute information of a background of the picture according to various embodiments of the present disclosure;

FIG. 12 is a flowchart provided to explain a process of synthesizing a product image with a picture for fitting use in an electronic apparatus, according to various embodiments of the present disclosure.

Throughout the drawings, it should be noted that like reference numbers are used to depict the same or similar elements, features, and structures.

DETAILED DESCRIPTION

Figure 1:
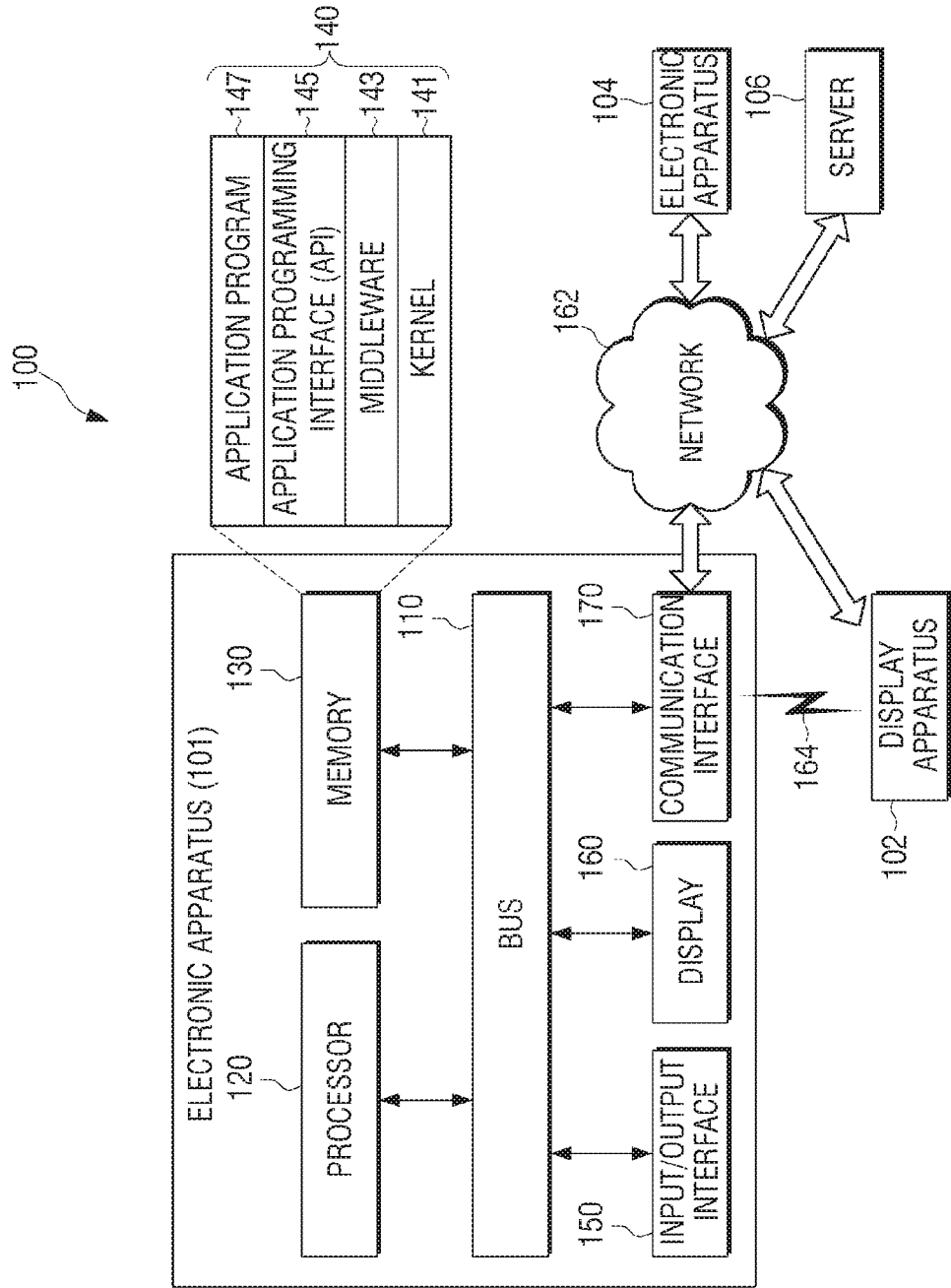
FIG. 1 is a view illustrating a network environment including an electronic apparatus, according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expressions such as "have", "may have", "include" or "may include" refer to the presence of the corresponding feature (for example, components such as numerical value, function, operation or part, etc.), and do not exclude the presence of additional features.

In the present disclosure, the expressions such as "A or B", "at least one of A and/or B" or "one or more of A and/or B" may include all possible combinations of the listed items. For example, "A or B", "at least one of A and B" or "at least one of A or B" may refer to all of (1) at least one A, (2) at least one B or (3) both at least one A and at least one B.

The expressions "the first", "the second" "first" and "second" used in the present disclosure may modify various elements, regardless of the order and/or the significance, and are only used to distinguish one element from another, and do not limit the corresponding elements. For example, a first user apparatus and a second user apparatus may represent different user apparatuses, regardless of the order or the significance. For example, a first element may be named a second element, and similarly, the second element may be named the first element, while not extending beyond the scope of the present disclosure.

When it is mentioned that an element (e.g. a first element) is "operatively or communicatively coupled with/to" or "connected to" another element (e.g. a second element), it shall be understood that the one element may be directly coupled with the other element, or may be coupled via another element (e.g. a third element). On the other hand, when it is mentioned that one element (e.g. a first element) is "directly coupled with/to" or "directly connected to" another element (e.g. a second element), it may be understood that no element (e.g. a third element) is present between the one element and another element.

The expression "configured to" used in the present disclosure may, depending on the situation, be interchangeably used as, for example, "suitable for", "having the capacity to", "designed to", "adapted to", "made to" or "capable of". The expression "configured to" does not necessarily mean "specifically designed to" in hardware wise. Instead, in some situations, the expression "apparatus configured to" may mean that the apparatus may be "configured to" do something with another apparatus or parts. For example, the phrase "a processor configured to perform A, b, and C" may refer to an exclusive processor (e.g. embedded processor) for performing the corresponding operations, or a generic-purpose processor (e.g. central processing unit (CPU) or application processor (AP)) for performing the corresponding operations by executing at least one software program stored in a memory apparatus.

The terms used in the present disclosure are used to explain an arbitrary embodiment, and may not intend to limit the scope of another embodiment. In addition, in the present specification, a singular expression may be used for convenience of explanation, but unless the expression has an obvious different meaning in the context, it may be understood as a concept that includes plural expressions as well. In addition, the terms used in the present specification may have a same meaning with what is commonly understood by those skilled in the art. The terms defined in a general dictionary of all the terms used in the present specification may be understood to have a same or similar meaning with the meaning in the context of the related art, and unless a term is specifically defined in the present specification, the term is not to be understood to have a meaning that is ideal or excessively perfunctory. Depending on the situation, even if a term is defined in the present specification, it may not be understood to exclude embodiments of the present specification.

The electronic apparatus according to various embodiments of the present disclosure may, for example, include at least one of a smartphone, a tablet personal computer (PC), an e-book reader, a desktop personal computer (PC), a laptop PC, a netbook computer, a workstation, and a server. In some embodiments, an electronic apparatus may be a home appliance. The home appliances may, for example, include at least one of a television, a TV box (e.g. Samsung HomeSync™, Apple TV™, or Google TV™), and an electronic frame.

According to an embodiment, an electronic apparatus may include at least one of an electronic board, an electronic signature receiving device, and a projector. In various embodiments, an electronic apparatus may be one of the aforementioned various devices or a combination thereof. An electronic apparatus according to some embodiment may be a flexible electronic apparatus. Also, an electronic apparatus according to embodiments of the present disclosure is not limited to the above-mentioned devices, and may include a new electronic apparatus according to development of a new technology.

Hereinafter, an electronic apparatus according to various embodiments will be described with reference to the accompanying drawings. In the present disclosure, the term "user" may refer to a person who uses an electronic apparatus or an apparatus (e.g. artificial intelligence electronic apparatus) that uses an electronic apparatus.

FIG. 1 is a view illustrating a network environment 100 including an electronic apparatus, according to various embodiments of the present disclosure.

Referring to FIG. 1, an electronic apparatus 101 in a network environment 100 according to various embodiments will be described with reference to FIG. 1. The electronic apparatus 101 may include a bus 110, a processor 120, a memory 130, an input/output interface 150, a display 160, and a transceiver or communication interface 170. In some embodiments, the electronic apparatus 101 may omit at least one of the elements, or further include another element.

The bus 110 may, for example, include a circuit which connects elements 110-170 with one another, and delivers communication (e.g. control message and/or data) between the elements.

The memory 130 may include a volatile and/or non-volatile memory. The memory 130 may, for example store a command related to at least one other element of the electronic apparatus 101, or data. According to an embodiment, the memory 130 may store software and/or a program 140. The program 140 may, for example, include a kernel 141, a middleware 143, an application programming interface (API) 145, and/or an application program (or "application") 147, etc.

At least part of the kernel 141, the middleware 140, or the API 145 may be referred to as an operating system (OS).

The kernel 141 may, for example, control or manage system resources (e.g. the bus 110, the processor 120, or the memory 130, etc.) used for executing an operation or function realized in other programs (e.g. the middleware 143, the API 145, or the application program 147). The kernel 141 may provide an interface capable of controlling or managing system resources by accessing individual elements of the electronic apparatus 101 from the middleware 143, the API 145, or the application program 147.

The middleware 143 may, for example, act as an intermediary so that the API 145 and the application program 147 could communicate and exchange data with the kernel 141.

The middleware may process one or more operation requests received from the application program 147 according to a priority. For example, the middleware 143 may assign at least one of the application programs 147 a priority to use a system resource (e.g. bus 110, processor 120, or memory 130, etc.) of the electronic apparatus 101. For example, the middleware 143 perform scheduling or load balancing, etc. with respect to the one or more operation requests by processing the at least one operation requests according to the assigned priority.

As illustrated in FIG. 1, the API 145 is, for example, an interface to control, by the application 147, functions provided by the kernel 141 or the middleware 143, which may include at least one interface or function (e.g. instruction) for file control, window control, image processing, or character control, etc.

The input/output interface 150 may, for example, play a role of an interface capable of conveying a command or data input from a user or another external apparatus to another element(s) of the electronic apparatus 101. The input/output interface 150 may output the command or data received from another element(s) of the electronic apparatus 101 to a user or another external apparatus.

The display 160 may, for example, include a liquid crystal display (LCD), a light-emitting diode (LED) display, an organic light-emitting diode (OLED) display, a microelectromechanical systems (MEMS) display, or an electronic paper display. The display 160 may, for example, display various contents (e.g. text, image, video, icon, or symbol, etc.) to a user. The display 160 may include a touch screen, and may, for example, receive a touch input using an electronic pen or using a body part of a user, a gesture, a proximity, or hovering.

The communication interface 170 may, for example, set a communication between the electronic apparatus 101 and an external apparatus (e.g. a first external electronic apparatus 102, a second external electronic apparatus 104 or a server 106). For example, as illustrated in FIG. 1, the communication interface 170 may be connected to a network 162 via a wireless communication or a wired communication to communicate with an external apparatus (e.g. the second external electronic apparatus 104 or the server 106).

A wireless communication is, for example, a cellular communication protocol, which may, for example, use at least one of a long-term evolution (LTE), a LTE advance (LTE-A), a code division multiple access (CDMA), a wideband CDMA (WCDMA), a universal mobile telecommunications system (UMTS), a wireless broadband (WiBro), and a global system for mobile communications (GSM), etc. The wireless communication may, for example, include a near field communication (NFC) 164. The NFC 164 may, for example, include at least one of wireless fidelity (WiFi), Bluetooth, NFC, or global navigation satellite system (GNSS), etc. The GNSS may include at least one of a global positioning system (GPS), a global navigation satellite system (Glonass), a Beidou Navigation satellite system (hereinafter, "Beidou") and Galileo, and the European global satellite-based navigation system, according to a region of use or bandwidth, etc. In the present disclosure, the "GPS" may be interchangeably used with "GNSS". A wired communication may, for example, include at least one of universal serial bus (USB), high definition multimedia interface (HDMI), recommended standard 232 (RS-232), and plain old telephone service (POTS). The network 162 may, for example, include a telecommunications network, a computer network (e.g. local area network (LAN) or wide area network (WAN)), the Internet, or a telephone network.

The processor 120, as illustrated in FIG. 1, may include at least one of a central processing unit (CPU), an application processor (AP), and a communication processor (CP). The processor 120 may, for example, execute calculation or data processing regarding control and/or communication of at least one other element of the electronic apparatus 101.

In particular, the processor 120, as illustrated in FIG. 1, may read pictures from the memory 130, first select pictures based on a weighted value, determine first attribute information and second attribute information from the first selected pictures, store the first attribute information and the second attribute information in a database form, second select at least one picture from the first selected pictures based on the first attribute information, the second attribute information and user context information, control the communication interface 170 to receive a product image corresponding to the second selected picture, and create a composite image by synthesizing the second selected picture and the product image.

Specifically, the processor 120 may first select pictures based on a weighted value at operation S1201, as illustrated in the flowchart of FIG. 12. The weighted value may be determined based on a date and/or time on which a picture is created. The processor 120 may compare date and/or time information included in a picture with today's date or present time, and as a result of comparison, when the date and/or time on which the picture is created is older than a predetermined period, determine that the picture is an old picture and lower the weighted value of the picture (e.g., according to the difference in time). In addition, the processor 120 may also determine a weighted value based on a shape of an object included in the picture. The object included in the picture may be a user, and the shape of the object may be divided into a front side, a lateral side, and a rear side. The processor 120 may analyze the picture, and determine whether the shape of the object is a front side, lateral side, or a rear side. The processor 120 may increase a weighted value of the picture when it is determined that the object of the picture is a front side. The processor 120 may further determine a weighted value based on whether a picture is shared. When a user shares a picture, shared information may be stored in the picture. The shared information may include a date and/or time on which the picture was shared, an address at which the picture was shared, and the name of the application that was used for sharing. The processor 120 may further determine whether a picture is shared by extracting sharing information from the picture, and increase a weighted value of the shared picture. The processor 120 may determine a weighted value based on a user interaction. After a user creates a picture, and then performs a zoom-in or zoom-out operation with respect to a picture or flicks the picture while reproducing the picture, user interaction information may be stored in the picture. The processor 120 may extract user interaction information from a picture stored in the memory 130, and determine a weighted value of the picture accordingly. For example, the processor 120 may control the display 160 to display a picture on a screen, and when a user performs a zoom-in gesture, detect the user interaction and store the detected user interaction in the picture. When the user interaction is a zoom-in gesture, a weighted value of the picture may be increased. The processor 120 may first select pictures of which a weighted value calculated using the above-mentioned method exceeds a predetermined value, and use the selected pictures for fitting use.

The processor 120, illustrated in FIG. 1, may determine first attribute information and second attribute information from the first selected one or more pictures. In this example, the first attribute information may be information on an object included in a picture. The object may be a user or clothes worn by the user. The processor 120 may recognize a user by analyzing the picture, extract a style, color, brand, size and other information of clothes worn by the user, and store the extracted information in the memory 130 as information on the object. The attribute information on a background may include a position of the background of a picture, weather, season or context, etc. The processor 120 may store the first attribute information and the second attribute information in the memory 130 in a database form. The first attribute information and the second attribute information may be structured, categorized and stored.

The processor 120, illustrated in FIG. 1, may second select at least one picture from the first selected one or more pictures based on the first attribute information, the second attribute information and user context information. The user context information may include position information of the user. The user context information may include information on an operational state of the user. For example, the context information may indicate whether the user is shopping, sleeping, going to work or eating.

The processor 120 may control the communication interface 170 to receive a product image corresponding to the second selected picture from the server 106. The second selected picture may be used to create a composite image. The product image may, for example, be an image of clothes provided by a third party. The product image may be selected based on information on a picture for fitting use provided by the electronic apparatus 101. The processor 120 may, when a user is located in a particular place or performs a particular action, select a picture for fitting use corresponding to the user context, and provide attribute information of the picture for fitting use to the server 106 or the display apparatus 102.

The processor 120 may synthesize the second selected picture with the product image to create a composite image. In this example, the processor 120 may create a composite image, but this is merely an example, and an external server 106 or the display apparatus 102 may create a composite image.

The processor 120 may control the display 160 to display the composite image. In this example, the processor 120 may control the display 160 to display the product image together with the composite image.

The external electronic apparatus 104, illustrated in FIG. 1, may be an apparatus of the same or different type as the electronic apparatus 101. According to an embodiment, the server 106 may include a group of one or more servers. According to various embodiments, all or some of the operations executed in the electronic apparatus 101 may be executed in another electronic apparatus or a plurality of electronic apparatuses (e.g. electronic apparatus 104 or server 106). According to an embodiment, when the electronic apparatus 101 is to perform a function or a service automatically or per request, the electronic apparatus 101 may request another apparatus (e.g. electronic apparatus 104 or server 106) to perform at least some of the functions related to the function or service either additionally or instead of executing the function or service by itself. Another electronic apparatus (e.g. electronic apparatus 104 or server 106) may execute the requested function or additional function, and transmit the result to the electronic apparatus 101. The electronic apparatus 101 may process the received result as it is or additionally process the received result to provide the requested function or service. To that end, for example, a cloud computing, distributed computing or client-server computing technology may be used.

The display apparatus 102 may, for example, be a large flat display (LFD). The LFD may communicate with the electronic apparatus 101 via the communication interface 170 of the electronic apparatus 101. The display apparatus 102 may communicate with the server 106 via the network 162.

Figure 2:
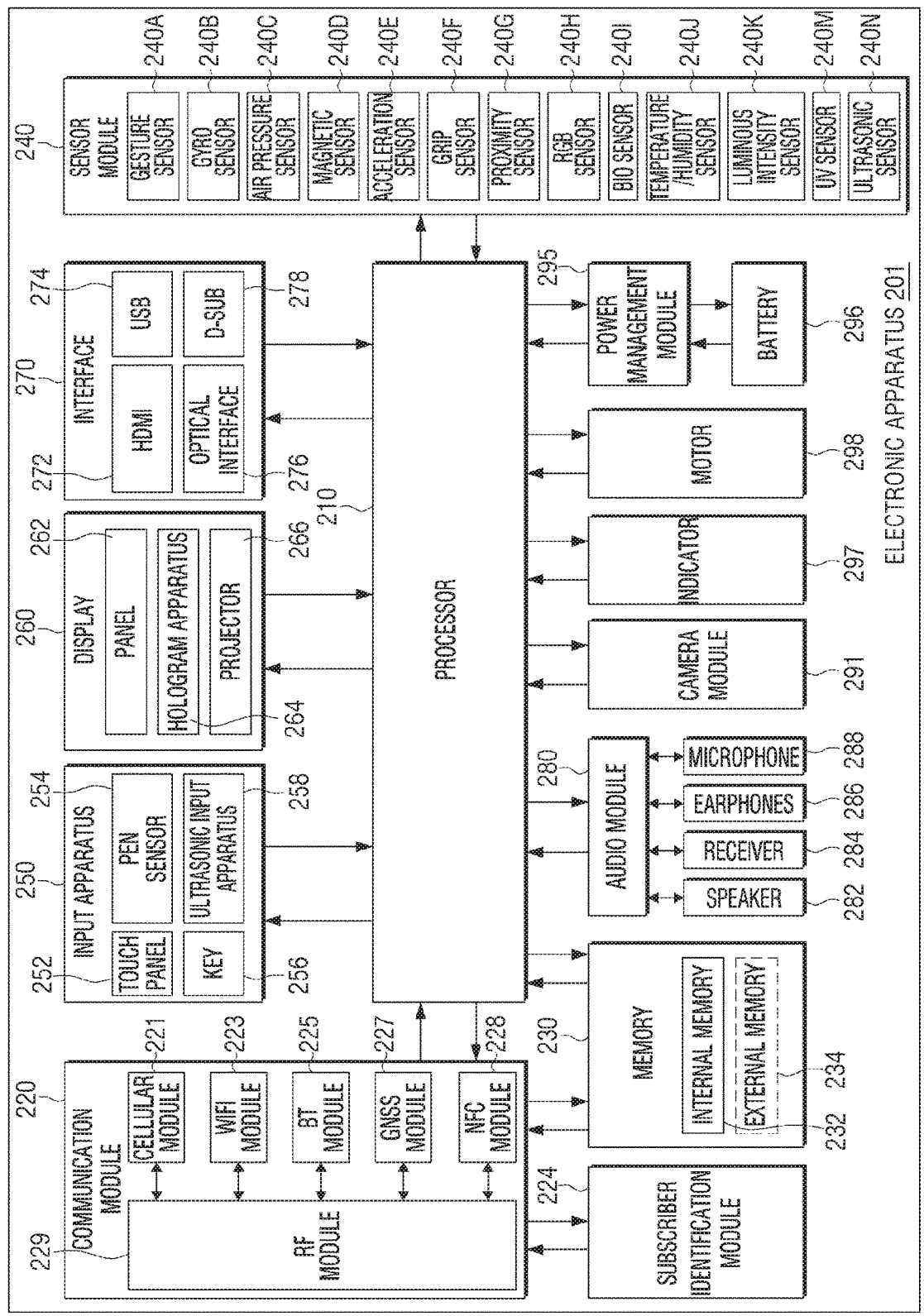
FIG. 2 is a block diagram of an electronic apparatus, according to various embodiments of the present disclosure.

FIG. 2 is a block diagram of an electronic apparatus, according to various embodiments of the present disclosure.

Referring to FIG. 2, the electronic apparatus 201 may, for example, include all or some of the components of the electronic apparatus 101 illustrated in FIG. 1. The electronic apparatus 201 may include at least one processor 210 (e.g. AP), a communication module 220, a subscriber identification module (SIM) 224, a memory 230, a sensor module 240, an input apparatus 250, a display 260, an interface 270, an audio module 280, a camera module 291, a power management module 295, a battery 296, an indicator 297, and a motor 298.

The processor 210 may, for example, control a number of hardware or software elements connected to the processor 210 by driving an operating system or application program, and perform various data processing and calculations. The processor 210 may, for example, be realized as a system on chip (SoC). According to an embodiment, the processor 210 may further include a graphic processing unit (GPU) and/or an image signal processor (ISP). The processor 210 may also include at least some (e.g. cellular module 221) of the elements illustrated in FIG. 2. The processor 210 may load a command or data received from at least one of other elements, such as non-volatile memory to a volatile memory to process it, and store various data in the non-volatile memory.

The communication module 220 may have a configuration that is the same as or similar to the communication interface 170 of FIG. 1. The communication module 220 may, for example, include a cellular module 221, a WiFi module 223, a Bluetooth (BT) module 225, a GNSS module 227 (e.g. GPS module, Glonass module, Beidou module, or Galileo module), a near field communication (NFC) module 228, and a radio frequency (RF) module 229.

The cellular module 221 may, for example, provide a voice call, a video call, a text messaging service, or an Internet service via a communication network. According to an embodiment, the cellular module 221 may perform identification and authentication of the electronic apparatus 201 within a communication network using the SIM (e.g. SIM card)) 224. According to an embodiment, the cellular module 221 may perform at least some of the functions providable by the processor 210. According to an embodiment, the cellular module 221 may include a CP. The WiFi module 223, the Bluetooth module 225, the GNSS module 227 or the NFC module 228 may, for example, include a processor to process data transmitted or received through the corresponding module, respectively. According to an embodiment, at least some (e.g. at least two) of the cellular module 221, the WiFi module 223, the Bluetooth module 225, the GNSS module 227, or the NFC module 228 may be included in one integrated chip (IC) or IC package.

The RF module 229 may, for example, transmit or receive a communication signal (e.g. RF signal). The RF module 229 may, for example, include a transceiver, a power amp module (PAM), a frequency filter, a low noise amplifier (LNA), or an antenna, etc. According to another embodiment, at least one of the cellular module 221, the WiFi module 223, the Bluetooth module 225, the GNSS module 227 and the NFC module 228 may transmit or receive an RF signal through a separate RF module.

Referring to FIG. 2, the subscriber identification module 224 may, for example, include a card or an embedded SIM including a subscribe identification module, and include a unique identification information (e.g. integrated circuit card identifier (ICCID)) or subscriber information (e.g. international mobile subscriber identity (IMSI)).

The memory 230 may, for example, include an embedded or internal memory 232 or an external memory 234. The embedded or internal memory 232 may, for example, include at least one of a volatile memory (e.g. dynamic random access memory (DRAM)), a static RAM, a synchronous dynamic RAM, a non-volatile memory (e.g. onetime programmable read only memory (OTPROM)), a programmable ROM (PROM), an erasable and programmable ROM (EPROM), an electrically erasable and programmable ROM (EEPROM), a mask ROM, a flash ROM, a flash memory (e.g. NAND flash or NOR flash, etc.), a hard drive, and a solid state drive (SSD).

The external memory 234 may further include a flash drive, such as a compact flash (CF), a secure digital (SD), a micro secure digital (micro-SD), a mini-SD, an extreme digital (xD), a multimedia card (MMC), or a memory stick.

The external memory 234 may be connected to the electronic apparatus 201 functionally and/or physically through various interfaces.

The sensor module 240 may, for example, may measure a physical quantity or detect an operational state of the electronic apparatus 201, and convert the measured or detected information into an electrical signal. The sensor module 240 may, for example, include a gesture sensor 240A, a gyro sensor 240B, a barometer or air pressure sensor 240C, a magnetic sensor 240D, an acceleration sensor 240E, a grip sensor 240F, a proximity sensor 240G, a color sensor 240H (e.g. red, green, blue (RGB) sensor), a medical or BIO sensor 240I, a temperature/humidity sensor 240J, an illuminance or luminous intensity sensor 240K, and an ultraviolet (UV) sensor 240M, and an ultrasonic sensor 240N. Additionally or alternatively, the sensor module 240 may, for example, include an electronic nose (E-nose) sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), and/or a finger scan sensor (not shown). The sensor module 240 may further include a control circuit to control at least one sensor included therein. According to an embodiment, the electronic apparatus 201 may further include a processor configured to control the sensor module 240 as part of the processor 210 or additionally, and control the sensor module 240 while the processor 210 is in a sleeping state.

As illustrated in FIG. 2, the electronic apparatus 250 may, for example, include a touch panel 252, a digital stylus or (digital) pen sensor 254, a key 256, or an ultrasonic input apparatus 258. The touch panel 252 may, for example, use at least one of electrostatic type, pressure sensitive type, IR type, and a UV type. The touch panel 252 may further include a control circuit. The touch panel 252 may further include a tactile layer to provide a tactile response to a user.

The (digital) pen sensor 254 may, for example, be part of a touch panel or include an additional sheet for recognizing use. The key 256 may, for example, include a physical button, an optical key, or a keypad. The ultrasonic input apparatus 258 may detect ultrasonic sound(s) created by an input tool through a microphone (e.g. microphone 288), and check data corresponding to the detected ultrasonic sound(s).

The display 260 may include a panel 262, a hologram apparatus 264 and/or a projector 266. The panel 262 may include a configuration that is the same as or similar to a configuration of the display 160 of FIG. 1. The panel 262 may, for example, be realized to be flexible, transparent or wearable. The panel 262 may be configured as one module together with the touch panel 252. The hologram apparatus 264 can display a stereoscopic image in the air using interference of light. The projector 266 may project light onto a screen to display an image. The screen may, for example, be located within or outside the electronic apparatus 201. According to an embodiment, the display 260 may further include a control circuit which controls the panel 262, the hologram apparatus 264, or the projector 266.

The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may, for example, convert a sound into an electrical signal, and an electrical signal into a sound. At least some elements of the audio module 280 may, for example, be included in the input/output interface 150 illustrated in FIG. 1. The audio module 280 may process sound information input or output through a speaker 282, a receiver 284, earphones 286, or the microphone 288, etc., as illustrated in FIG. 2.

The camera module 291 is, for example, an apparatus which captures a still image and a video, and according to an embodiment, include at least one image sensor (e.g. front sensor or rear sensor), a lens, an ISP, or a flash (e.g. LED or xenon lamp, etc.).

The power management module 295 may, for example, manage power of the electronic apparatus 201. According to an embodiment, the power management module 295 may include a power management integrated circuit (PMIC), a charger IC, a gauge for battery 296, or a fuel gauge. The PMIC may use a wired and/or wireless charging method. The wireless charging method may, for example, include a magnetic resonance method, an electromagnetic inductive method, an electromagnetic method, or etc., and further include, for example, a coil loop, a resonance circuit, a rectifier, or etc. The battery gauge may, for example, measure a residual amount of the battery 296, and a voltage, current, or temperature while charging. The battery 296 may, for example, include a rechargeable battery and/or a solar battery.

The indicator 297, as illustrated in FIG. 2, may display a particular state, for example, a booting state, a messaging state, a charging state, or etc., of the electronic apparatus 201 or of part of the electronic apparatus 201 (e.g. processor 210). The motor 298 may convert an electrical signal into a mechanical vibration, and create vibration, haptic effect, or etc. Although not illustrated, the electronic apparatus 201 may include a processing apparatus (e.g. GPU) for supporting a mobile TV. The processing apparatus for supporting a mobile TV may, for example, process media data in accordance with a standard, such as a digital multimedia broadcasting (DMB), a digital video broadcasting (DVB), a media Flo™, etc.

The elements described in the present disclosure may respectively configured as one or more components, and the name of each element may vary depending on the type of an electronic apparatus. In various embodiments, an electronic apparatus may be configured to include at least one of the elements described in the present disclosure, and omit some elements or further include another element. Also, some of the elements of an electronic apparatus according to various embodiments may be combined to be a single entity to perform the same function of the corresponding elements as the elements before combination.

Figure 3:
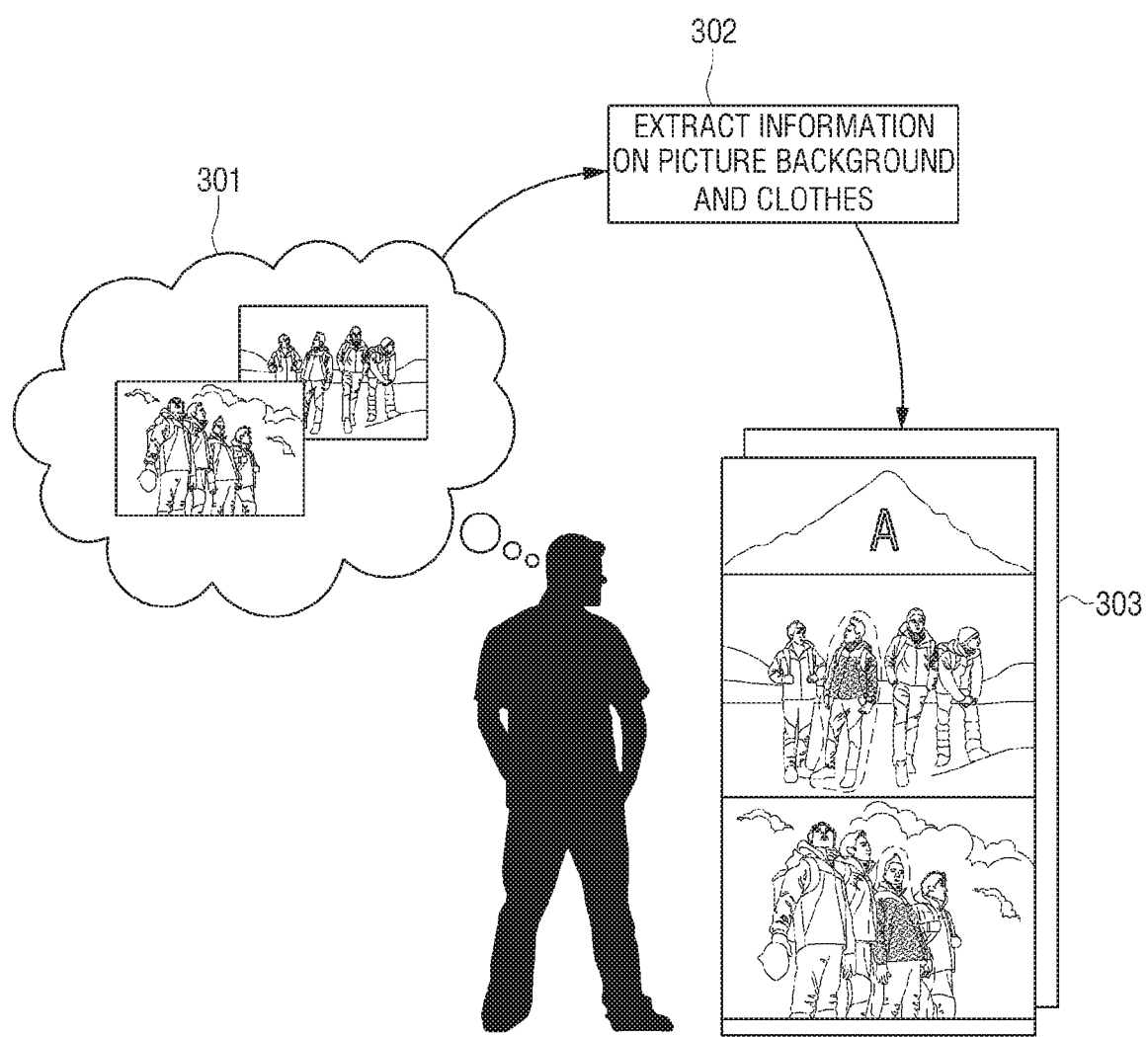
FIG. 3 is a rough flowchart of the present disclosure according to various embodiments of the present disclosure.

FIG. 3 is a schematized flowchart of the present disclosure according to various embodiments of the present disclosure.

Referring to FIG. 3, the electronic apparatus 101 may analyze a plurality of pictures stored in the electronic apparatus 101 to identify a taste of the user and a brand of clothes worn by a user in the picture. The electronic apparatus 101 may select a plurality of pictures stored in a memory based on a user preference, at operation 301. The detailed method of selecting pictures by the electronic apparatus 101 will be provided later.

Once the pictures are selected, the electronic apparatus 101 or 201 may analyze the selected pictures and extract information on the backgrounds of the pictures and information on objects, typically clothes, included in the pictures, at operation 302. The information on clothes may, as non-limiting examples, be a brand name, color, size of the clothes, etc. The image of clothes included in the picture(s) may be an image of the clothes worn by the user or an image of the clothes worn by a different person or persons.

The background information and clothes information extracted by the electronic apparatus 101 from the pictures may be stored in the memory 130 or 230. For example, the electronic apparatus 101 or 201 may recognize that background information of a picture of the user while climbing a mountain is a "mountain". Also, the electronic apparatus 101 may extract a brand name of clothes worn by the user in the picture. The electronic apparatus 101 may include, in the picture, a background extracted from the picture and a brand name of clothes worn by the user and store the same, or store it in the form of a separate data file.

As such, the electronic apparatus 101 may extract information of the picture and the information on the clothes worn by the user from the selected picture, and transmit the selected picture, the background information and the clothes information to the server 106, illustrated in FIG. 1.

The server 106 may determine a context of the received picture based on information on the picture and clothes provided by the electronic apparatus 101, and retrieve clothes information corresponding to the context and provide the information, or may synthesize the retrieved product image and the picture provided by the electronic apparatus 101 to create a composite image and transmit the created composite image to the electronic apparatus 101 or to the display apparatus 102 disposed in a position where the user is located, at operation 303. Alternatively, the electronic apparatus 101 may synthesize the transmitted product image and the selected picture stored in the electronic apparatus 101 to create a composite image, and display the composite image on the electronic apparatus 101.

FIG. 4 is a view illustrating a process of selecting a plurality of pictures stored in the electronic apparatus 101 according to various embodiments of the present disclosure.

Referring to FIG. 4, the electronic apparatus 101 may assign a weighted value to a picture stored in the memory 130, and select pictures based on the weighted value. A "picture" in the present disclosure may refer to "data to form a picture" or a "picture file". For example, a picture stored in a memory may refer to "data to form a picture" displayed on a display.

The electronic apparatus 101 may assign a weighted value based on a date and/or time on/at which a picture is taken. For example, the electronic apparatus 101 may assign a high weighed value to a more recently taken picture, at operation 401.

The electronic apparatus 101 may analyze a captured picture, and determine a weighted value for the picture based on an orientation of an object included in the picture. For example, the electronic apparatus may, if the orientation of an object included in a picture is front view, assign a higher weighted value, and if the orientation of the object is side view or rear view, assign a lower weighted value, at operation 402.

The electronic apparatus 101 may determine a weighted value for the picture based on a user interaction detected while the display 160 displays a captured picture. For example, in the state that a picture is displayed on the display 160, when the user performs a zoom-in gesture, as illustrated in FIG. 4, the electronic apparatus 101 may assign a high weighted value, at operation 403. When the user performs a zoom-in gesture while a picture is displayed on the display 160, the electronic apparatus 101 may determine that the user enlarged the picture out of interest, and increase a weighted value with respect to the picture. On the other hand, when the user performs a flick gesture while the picture is displayed on the display 160, the electronic apparatus 101 may determine that the user is not interested the corresponding picture and changes the picture, and reduce the weighted value.

The electronic apparatus 101 may determine a weighted value based on whether a picture is shared or not. When the user shares a picture (e.g. when a picture is uploaded to a social networking site (SNS)), the electronic apparatus 101 may set a high weighted value with respect to the picture, at operation 404. For example, when the user depresses the button "share" while a picture is displayed on the display 160, the electronic apparatus 101 may increase a weighted value of the picture.

When a picture is used as a profile or a background, the electronic apparatus 101 may set a high weighted value with respect to the picture, at operation 405.

The electronic apparatus 101 may determine a weighted value based on access information of the picture. When the user accesses the picture, the electronic apparatus 101 may store the access information of the picture in the picture or picture file. The access information may be information on a date and/or time on which the user accessed the picture. The electronic apparatus 101 may update access information of the picture every time the user accesses the picture. The electronic apparatus 101 may extract access information from the picture, and when the date/time of access is older than a predetermined date/time, recognize the picture as a neglected picture and set a low weighted value with respect to the picture, at operation 411.

When the user performs a flick gesture while a picture is displayed, the electronic apparatus 101 may determine that the user has little or no interest in the corresponding picture and changes the picture, and set a low weighted value for the corresponding picture, at operation 412.

The electronic apparatus 101 may determine a weighted value based on information on deletion of a picture. For example, the electronic apparatus 101 may recognize that a picture was taken by the user, and then transmitted to a cloud server. Subsequently, when the picture is deleted from the electronic apparatus 101, the electronic apparatus may set a low weighted value with respect to the picture, at operation 413, and transmit information on a weighted value of the corresponding picture to the cloud server.

FIG. 5 is a view illustrating a process of selecting, by the electronic apparatus 101, a picture received from the server 106 according to various embodiments of the present disclosure.

Referring to FIG. 5, the electronic apparatus 101 may assign a weighted value to a picture received from the server 106 (illustrated in FIG. 1), and select pictures based on the weighted value. In the case where the user is surfing the web via a wired or wireless network 162, the electronic apparatus 101 may receive pictures from the server 106. For example, when the user retrieves pictures through web surfing, the electronic apparatus 101 may receive pictures from the corresponding server.

The electronic apparatus 101 may determine a weighted value based on whether a picture received from the server 106 was downloaded from the Internet. For example, when the user access an online shopping mall and downloads a particular picture while retrieving a product, the electronic apparatus 101 may set a high weighted value with respect to the corresponding picture, at operation 501.

The electronic apparatus 101 may determine a weighted value based on a screen capturing operation of the user. For example, when the user captures a particular picture while surfing the web, the electronic apparatus 101 may assign a high weighted value with respect to the captured picture, at operation 502.

The electronic apparatus 101 may detect a user interaction with respect to a picture received from the server 106, and determine a weighted value based on a user interaction. For example, in the case where the user performs a zoom-in gesture with respect to a particular picture while surfing the web, the electronic apparatus 101 may set a high weighted value with respect to the corresponding picture, at operation 503.

The electronic apparatus 101 may determine a weighted value based on a time at which a picture received from the server is displayed on a screen. For example, when the user displays a picture on a screen for a predetermined time or longer while surfing the web, the electronic apparatus 101 may set a high weighted value with respect to the corresponding picture, at operation 504, based on the screen gazing time.

The electronic apparatus 101 may determine a weighted value with respect to a picture received from the server 106 based on whether the user shares the picture on SNS. For example, when the user clicks an SNS share button while looking at a picture and surfing the web, the electronic apparatus 101 may set a high weighted value with respect to the corresponding picture, at operation 505.

The electronic apparatus 101 may detect a user interaction with respect to a picture received from the server 106, and determine a weighted value based on the user interaction. For example, as illustrated in FIG. 5, in the state that the user is surfing the web, when the user clicks a back button while a picture is displayed on a screen, the electronic apparatus 101 may set a low weighted value with respect to the corresponding feature, at operation S11. Alternatively, while surfing the web, when the user performs a flick gesture with respect to a picture displayed on a screen and changes the picture to another picture, the electronic apparatus 101 may set a low weighted value with respect to the corresponding picture, at operation S12.

Figure 6:
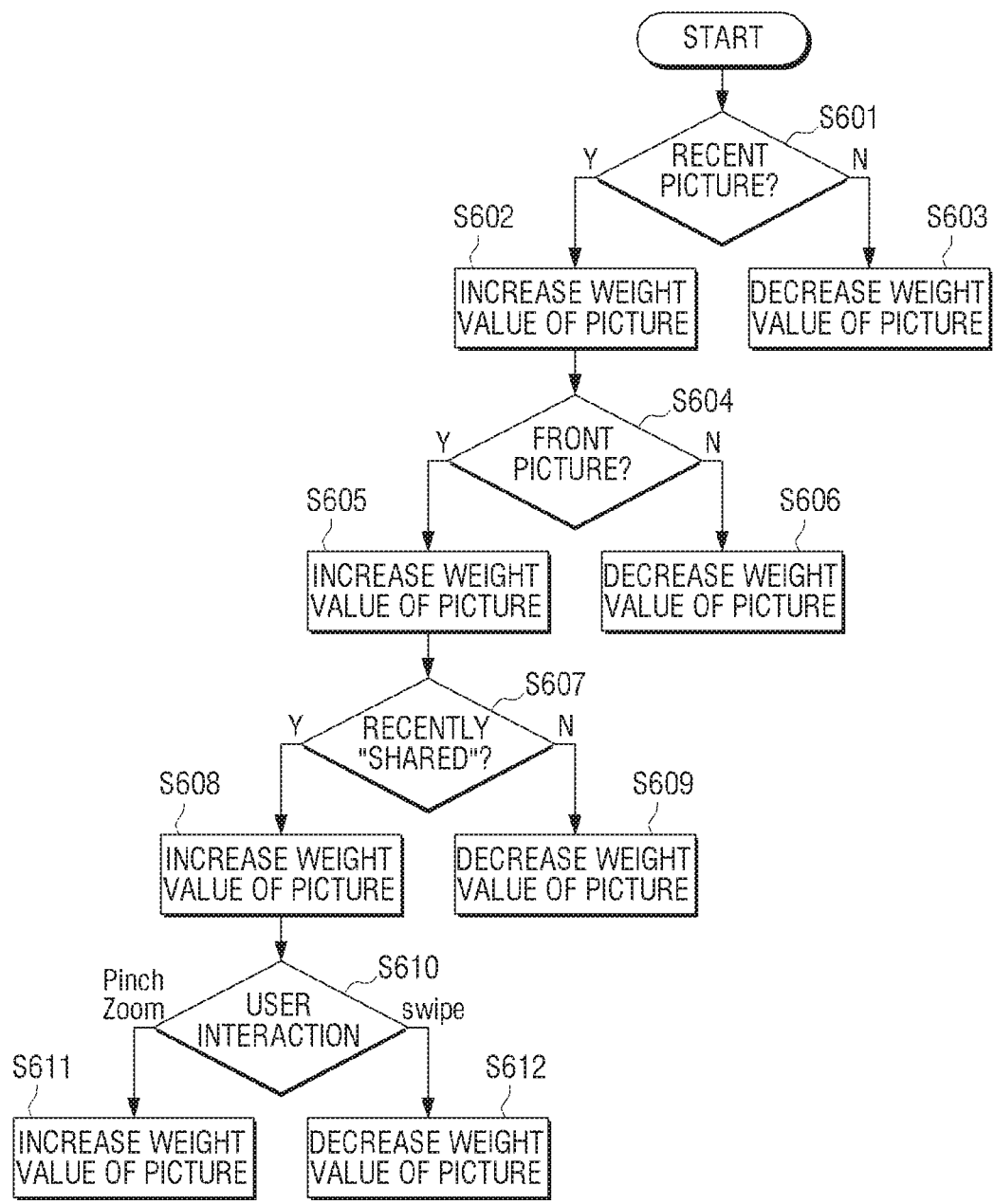
FIG. 6 is a flowchart of a method of assigning a weighted value with respect to a picture created by a user according to various embodiments of the present disclosure.

FIG. 6 is a flowchart of a process of assigning a weighted value to a picture created by a user according to various embodiments of the present disclosure.

Referring to FIG. 6, the electronic apparatus 101 reads a picture from the memory 130. The picture may have been stored in the memory 130 of the electronic apparatus 101 or in a cloud server, after being created through a camera included in the electronic apparatus 101. The electronic apparatus 101 may determine whether the read picture was taken recently, at operation S601. The electronic apparatus 101 may extract date/time information from a picture, and compare the extracted date/time information with a current date/time. As a result of the comparison, if the picture was created before a predetermined date/time, "Yes" at operation S601, the electronic apparatus 101 may determine that the picture is a recent picture, and increase a weighted value of the picture. If the picture was created after a predetermined date/time, "No" at operation S601, the electronic apparatus 101 may reduce or decrease the weighted value of the picture, at operation S603.

The electronic apparatus 101 may analyze the read picture, and determine whether an object included in the picture faces the front to determine whether the picture is a front picture, at operation S604. If it is determined that the picture is a front picture, "Yes" in operation S604, the electronic apparatus 101 may increase a weighted value of the picture, at operation S605. If it is determined that the picture is not a front picture, "No" in operation S604, the electronic apparatus may reduce a weighted value of the picture, at operation S606.

Referring to FIG. 6, the electronic apparatus 101 may determine whether the read picture was shared recently, at operation S607. If it is determined that the picture was shared recently, "Yes" in operation S607, the electronic apparatus 101 may increase the weighted value of the picture, at operation S608. If it is determined that the picture was not shared recently, "No" in operation S607, the electronic apparatus 101 may reduce the weighted value of the picture, at operation S609. When the user executes an SNS application to share a picture while the picture is displayed on the screen, sharing information of the corresponding picture may be stored in the picture. The sharing information may include a sharing date, time, and the name of application executed to share the picture. The electronic apparatus 101 may analyze sharing information included in the picture to determine whether the corresponding picture has been shared.

The electronic apparatus 101 may detect a user interaction while the picture is displayed on the display 160, and set a weighted value for the picture based on the user interaction, at operation S610. The electronic apparatus 101 may display the picture on the display 160. When the user interaction is detected while the picture is displayed on the display 160, the electronic apparatus 101 may identify the detected interaction, and store the identified result in the picture. The electronic apparatus 101 may read interaction information included in the picture, and if the interaction information is a "zoom-in", increase a weighted value of the picture, at operation S611. The electronic apparatus 101 may reduce the weighted value of the picture if the interaction information included in the picture is a "swipe", at operation S612.

Figure 7:
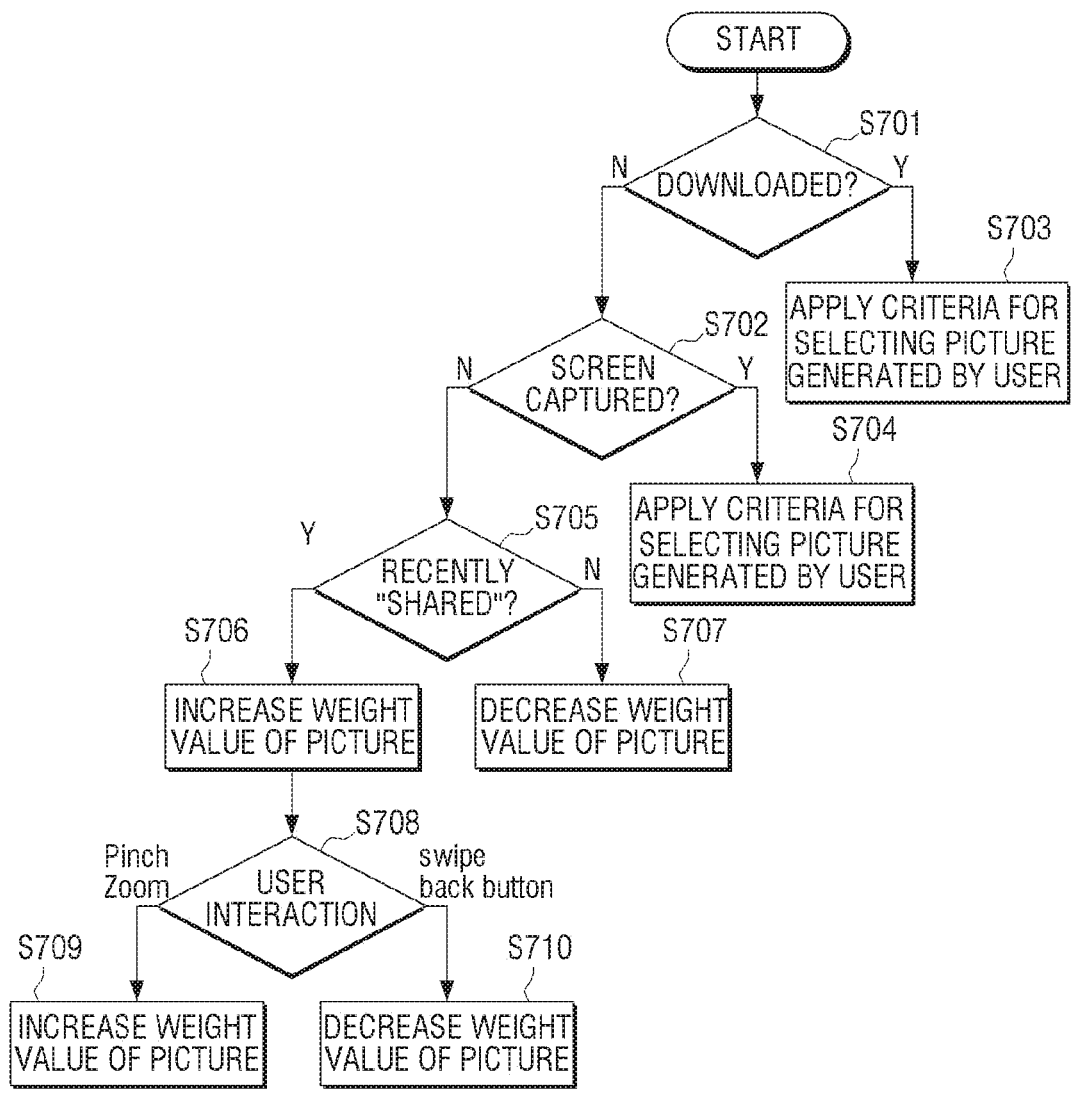
FIG. 7 is a flowchart of a method of assigning a weighted value with respect to a picture received from a server according to various embodiments of the present disclosure.

FIG. 7 is a flowchart of a process of assigning a weighted value to a picture received from the server 106 according to various embodiments of the present disclosure.

Referring to FIG. 7, in the case where the user is surfing the web via a wired or wireless network 162, the electronic apparatus 101 may receive a webpage including a picture from the corresponding server 106. For example, when the user retrieves a picture through web surfing, the electronic apparatus 101 may receive the picture from the corresponding server 106. Also, if the user is provided with the photo from a seller or a vendor website via e-mail, the electronic apparatus 101 may receive the picture from the corresponding server 106.

When the user accesses the Internet, the display 160 of the electronic apparatus 101 may display a webpage. The electronic apparatus 101 may determine whether the user downloads a picture while the webpage is displayed on the display 160, at operation S701. When the user downloads a picture, "Yes" in operation S701, the electronic apparatus 101 may apply picture selection criteria (for example, picture captured by the user with his or her camera) created by the user to the downloaded picture to select pictures, at operation S703. The detailed method of selecting a user created picture is described with respect to FIG. 6 and thus the details thereof are omitted herein. If the user does not download a picture, "No" in operation S701, the electronic apparatus 101 may determine whether the user captures a screen of a picture displayed on the display 160, at operation S702. If the user captures the screen of the picture, "Yes" in operation S702, the electronic apparatus 101 may select the picture by applying picture selection criteria created by the user to the picture, at operation S704. When the user does not capture the screen of the picture, "No" in operation S702, the electronic apparatus 101 may determine whether the corresponding picture was shared recently, at operation S705. When the picture was not shared recently, "No" in operation S705, the electronic apparatus 101 may reduce a weight value of the corresponding picture, at operation S707. When the picture was shared recently, "Yes" in operation S705, the electronic apparatus 101 may increase the weighted value of the corresponding picture, at operation S706.

The electronic apparatus 101 may detect a user interaction while the picture is displayed on the display 160, at operation S708. If the user interaction is a zoom-in gesture, the electronic apparatus 101 may increase a weighted value of the picture, at operation S709. If the user interaction is a swipe gesture, a flick gesture or a back button, the electronic apparatus 101 may reduce a weighted value of the picture, at operation S710.

FIG. 8 is a view illustrating an example of extracting, from a selected picture, attribute information of clothes included in the picture and attribute information of a background of the picture according to various embodiments of the present disclosure.

Referring to FIG. 8, the present disclosure, as an example, only takes an example of clothes worn by a person, but other objects (e.g. accessories and wearable device) wearable by a person may be used instead of the clothes.

FIG. 8 illustrates pictures 801, 811, 821. The electronic apparatus 101 may extract, from the pictures 801, 811, 821, various attributes of clothes worn by an object (or person) included in the pictures 801, 811, 821, and the attributes of the backgrounds of the pictures.

The attribute information on clothes may include a style, color, brand, size and other information of the clothes. For example, the style attribute of clothes may include "dress shirt", "formal suit", "casual", or etc. The size attribute of clothes may include "M", "L", "XL", "XXL" and the like.

The attribute information of background may include a location of a background of the picture, weather, season, context, or etc. For example, the background location attribute of the picture may include "mountain", "beach", "urban area", etc. The weather attribute may include "clear", "cloudy", "rainy", "snowy", etc. The weather attribute may include "spring", "summer", "autumn", and "winter". The context attribute may include "drinking", "wedding" "mountain climbing", "exercising", etc.

The electronic apparatus 101 may extract attribute information on clothes and background from a selected picture, and store attribute information in the memory 130 or the server 106 in a database form. Alternatively, the extracted attribute information may be stored along with the picture.

For example, the electronic apparatus 101 may extract the picture 801, and identify that the color of clothes worn by the identified user is "yellow" and that the style is "outdoor clothing". The electronic apparatus 101 may extract the color as "yellow" and the style as "outdoor clothing" as attribute information of the clothes, and store the extracted attribute information of clothes in the picture 801 or create the information in a separate file and store the file in the electronic apparatus 101 or in the server 106. Also, the electronic apparatus 101 may analyze the picture 801, and identify a location of background of the picture 801 as "mountain", the weather as "clear", and the context as "mountain climbing". The electronic apparatus 101 may extract "mountain", "clear" and "mountain climbing" as attribute information on background of the picture from the picture 801, and store the extracted attribute information of the background in the picture 801 or store the information in the electronic apparatus 101 or the server 106 as a separate file.

The electronic apparatus 101 may analyze the picture 811, and identify a color of clothes worn by the identified user as "white" and the style "wedding dress", for example. The electronic apparatus may extract "white" for the color and "wedding dress" for the style as attribute information of clothes, and store the extract attribute information on clothes in the picture 811, or create a separate file and store the file in the electronic apparatus 101 or the server 106. Also, the electronic apparatus 101 may analyze the picture 811, and identify "outdoor" for a location of background of the picture 811, "clear" for weather, and "wedding" for context. The electronic apparatus may extract, from the picture 811, "outdoor", "clear" and "wedding" for attribute information on background of the picture, and store the extracted attribute information of the picture 811 in the picture 811, or create a separate file and store the file in the electronic apparatus 101 or the server 106.

The electronic apparatus 101 may analyze the picture 821, and identify the color of clothes worn by the identified user as "blue", the size as "M" (medium), and the style as "T-shirt". The electronic apparatus 101 may extract the color "blue" and the style "T-shirt" and the size "M" for attribute information of clothes, and store the extracted attribute information of clothes in the picture 821 or create a separate file and store the file in the electronic apparatus 101 or the server 106. Also, the electronic apparatus 101 may analyze the picture 821, and identify that a location of background of the picture 821 is the "beach", that the weather is "clear", and that the context is "traveling". The electronic apparatus 101 may extract, from the picture 821, the location of background as "outdoor", the weather as "clear", and the context as "traveling" as attribute information of the picture, and store the extracted background attribute information of the picture 821 in the picture 821 or create a separate file and store the file in the electronic apparatus 101 or in the server 106.

The electronic apparatus may combine the stored attribute information of the background and of the clothes to make a virtual table 831, and determine a brand, size, color, etc. of clothes preferred by the user.

Figure 9A:
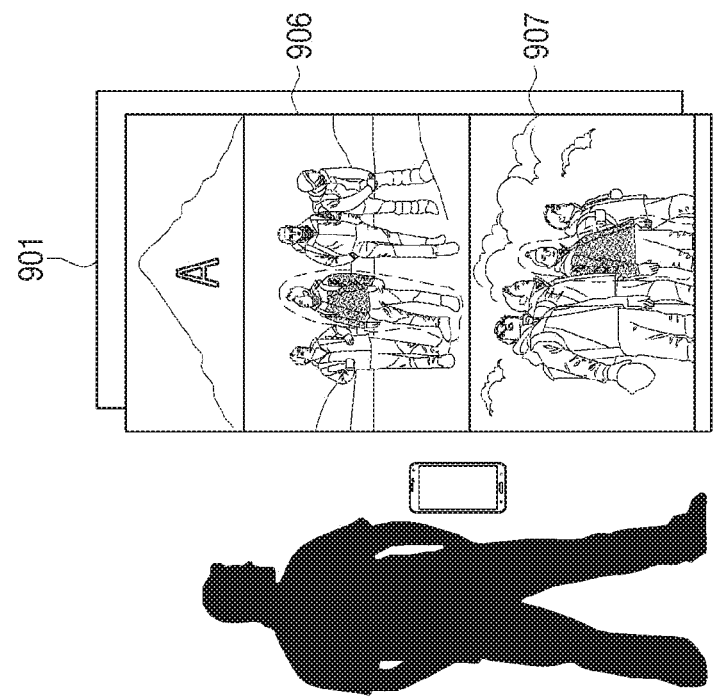
FIGS. 9A and 9B are views illustrating an example of recommending a user preferred clothes using attribute information of a picture according to various embodiments of the present disclosure.
Figure 9B:
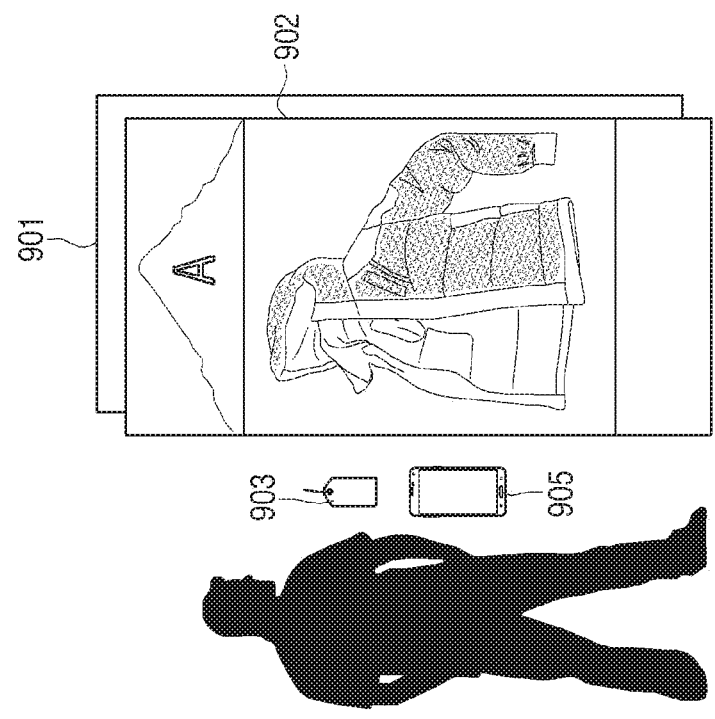

FIGS. 9A and 9B are views illustrating an example of recommending clothes preferred by a user by means of attribute information of a picture according to various embodiments of the present disclosure.

Referring to FIGS. 9A and 9B, FIGS. 9A and 9B illustrate a display apparatus 901 exhibited in a store. The display apparatus 901 may, for example, be a large flat display (LFD). When the user selects clothes in the store and tags the clothes on the display apparatus 901, at operation 903, the display apparatus 901 may display an image 902 of the clothes selected by the user (as illustrated in FIG. 9A).

Alternatively, an electronic apparatus 905 may advertise attribute information of clothes stored in a memory to the display apparatus 901, and the display apparatus 901 may receive attribute information of the advertised clothes, retrieve clothes preferred by the user based on the attribute information of clothes, and display the image 902 corresponding to the retrieved clothes.

Alternatively, the electronic apparatus 905 may transmit a picture selected for fitting use stored in the electronic apparatus 905 to the display apparatus 901 by means of a near field communication (for example, NFC, WiFi), and the display apparatus 901 may synthesize the image of clothes selected by the user with the transmitted picture for fitting use to create composite images, and display the created composite images 906, 907 (as illustrated in FIG. 9B).

Figure 10:
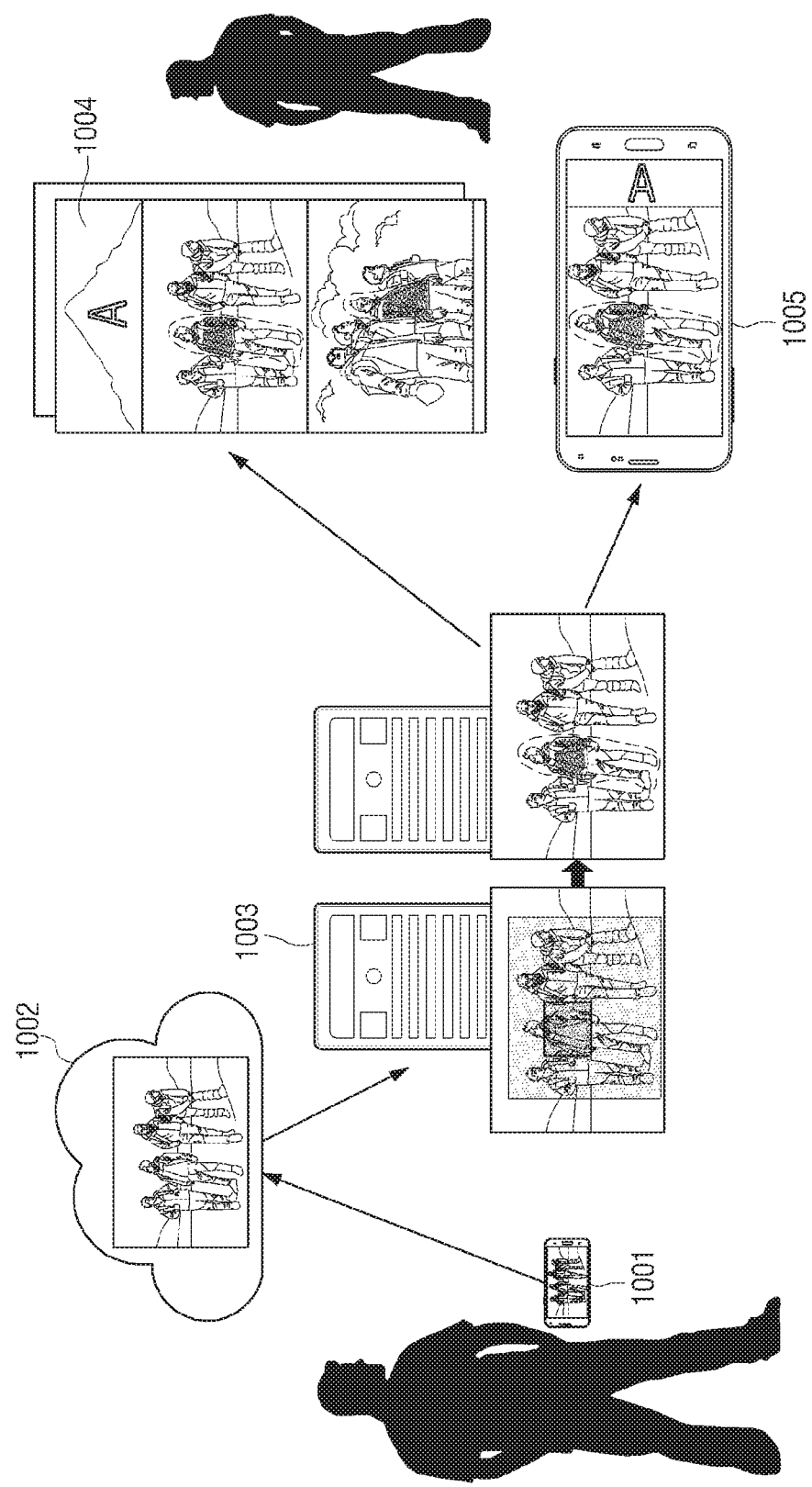
FIG. 10 is a view provided to explain an example of synthesizing a user created picture with a product image provided by a third party and providing the same according to various embodiments of the present disclosure.

FIG. 10 is a view provided to explain an example of synthesizing a product image provided by a third party with a picture created by a user and providing the same according to various embodiments of the present disclosure.

FIG. 10 illustrates an electronic apparatus 1001, a cloud server 1002, a picture analysis server 1003, a display apparatus 1004, and an electronic apparatus 1005. The electronic apparatus 1001 and the electronic apparatus 1005 are the same type of electronic apparatus, for example, a smartphone carried around by a user. The electronic apparatus 1001 may determine a selected picture as a picture for fitting use based on a weighted value. The picture for fitting use may store attribute information on clothes and background. The electronic apparatus 1001 may transmit the selected picture for fitting use to the cloud server 1002. The picture for fitting use may automatically be transmitted to the cloud server 1002. The cloud server 1002 may store the picture for fitting use received from the electronic apparatus 1001. The cloud server 1002 may transmit the picture for fitting use to the picture analysis server 1003. The picture analysis server 1003 may analyze the picture for fitting use received from the cloud server 1002 and determine a context of the picture. The context of a picture may be determined by combining clothes included in the picture with an attribute of the picture. The picture analysis server 1003 may be a server provided by a third party (for example, a seller of clothes). According to an embodiment, the cloud server 1002 may also serve as the picture analysis server 1003. When a context of the picture for fitting use is determined in the picture analysis server 1003, the picture analysis server 1003 may retrieve an image of clothes corresponding to the context of the picture, and synthesize the picture for fitting use with the retrieved image of clothes to create a composite image. The picture analysis server 1003 may transmit the composite image to the display apparatus 1004 and the electronic apparatus 1005 of the user. The picture analysis server 1003 may transmit the composite image to the display apparatus 1004 by a request of the display apparatus 1004. When the user approaches near the display apparatus 1004, the display apparatus 1004 may send a request for a composite image to the picture analysis server 1003, and display the composite image received from the picture analysis server 1003 to be viewed by the user. Alternatively, the picture analysis server 1003 may transmit the composite image to the electronic apparatus 1005 of the user based on position information of the user. The electronic apparatus 1005 may receive the composite image and display the image on a display.

For example, when a user who has a smartphone enters a store of a third party, the display apparatus 1004, illustrated in FIG. 10, may receive information of the user advertised from the smartphone of the user via Bluetooth low energy (BLE), and identify the user. When the display apparatus 1004 identifies the user, the display apparatus 1004 may send a request for a composite image corresponding to the user to the picture analysis server 1003, and receive the composite image to display it in the display apparatus 1004 for the user. Alternatively, when the display apparatus 1004 receives position information of the user and transmits the information to the picture analysis server 1003, the picture analysis server 1003 may transmit a composite image corresponding to the user to the smartphone of the user. Alternatively, when it is determined that the picture analysis server 1003 receives position information from the smartphone 1005 of the user and that the user enters the store, the picture analysis server 1003 may transmit a composite image corresponding to the user to the smartphone 1005 of the user.

Figure 11:
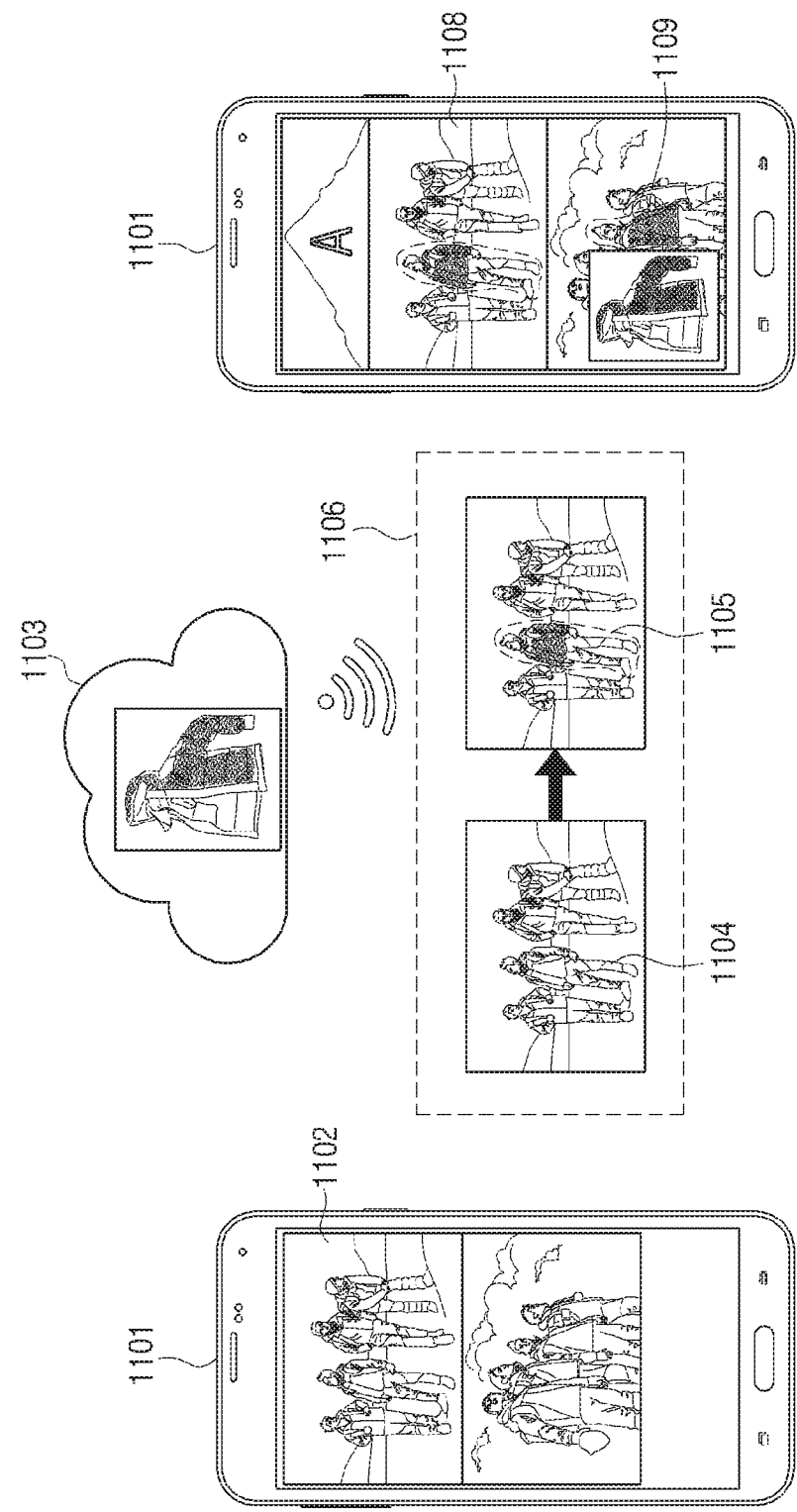
FIG. 11 is a view provided to explain a process of synthesizing a product image with a picture for fitting use stored in an electronic apparatus according to various embodiments of the present disclosure.

FIG. 11 is a view provided to explain a process of synthesizing a product image with a picture for fitting use stored in an electronic apparatus according to various embodiments of the present disclosure.

Referring to FIG. 11, an electronic apparatus 1101 may determine a selected picture as a picture for fitting use based on a weighted value. The picture for fitting use may include attribute information of clothes and background. Alternatively, the attribute information of clothes and background may be stored in a memory in the form of a separate database file, and may be retrieved. The electronic apparatus 1101 may retrieve a picture for fitting use stored in the memory based on position information of the user. For example, if the user is in an outdoor clothing store, the electronic apparatus 1101 may determine that the current position of the user is in an outdoor clothing store based on position information of the user, and retrieve a picture having outdoor clothing attribute from among pictures for fitting use stored in the memory.

The electronic apparatus 1101 may retrieve a picture for fitting use stored in the memory based on information on a current weather. For example, when the weather is clear, the electronic apparatus 1101 may retrieve a picture having the attribute of "clear" from among the pictures for fitting use stored in the memory.

Referring to FIG. 11, the electronic apparatus 1101 may retrieve a picture for fitting use stored in the memory based on information on a current season. For example, if the weather is autumn, the electronic apparatus 1101 may retrieve a picture having the attribute of "autumn" from among the pictures for fitting use stored in the memory. The electronic apparatus 1101 may display the retrieved picture image 1102 on a display.

If the user is at a store for outdoor clothing, the electronic apparatus 1101 may receive advertisement content 1103 corresponding to the store brand from the server. The advertisement content 1103 may, for example, be a product image. For example, if the user is at a store of "K brand", the electronic apparatus 1101 may receive the advertisement content 1103 of the "K brand" from the server.

When receiving the advertisement content 1103 from the server, the electronic apparatus 1101 may synthesize the advertisement content 1103 with the retrieved picture image 1102 to create a composite image 1105. For example, in operation 1106, if an object 1104 included in the retrieved image is wearing yellow outdoor clothes, the electronic apparatus 1101 may synthesize the advertisement content 1103 received from the server with the retrieved image, and change the object to the object 1105 wearing a green outdoor clothes and create a composite image. The electronic apparatus 1101 may display the created composite image 1108 on the display.

The electronic apparatus 1101 may display the advertisement content 1109 received from the server. For example, the electronic apparatus 1101 may display the advertisement content 1109 as being overlapped with the composite image 1108 on the display. Alternatively, the electronic apparatus 1101 may separately display the advertisement content 1109 on the display (e.g. display apparatus).

FIG. 12 is a flowchart provided to explain a process of synthesizing a product image with a picture for fitting use in an electronic apparatus, according to various embodiments of the present disclosure.

Referring to FIG. 12, an electronic apparatus 101 may first select a picture based on a weighted value, at operation S1201. The weighted value may be determined based on a date/time on which the picture was created. The electronic apparatus 101 may compare date/time information included in the picture with today's date/time, when the date/time on which the picture was created is longer than a predetermined period, the electronic apparatus 101 may determine that the picture is an old picture and reduce the weighted value of the picture, e.g., according to the age of the picture.

The weighted value may be determined based on a shape of an object included in the picture. The object included in the picture may be a user, and the shape of the object may be divided into a front side, a lateral side, and a rear side. The electronic apparatus 101 may analyze the picture and determine whether the shape of the object is a front side, a lateral side or a rear side. The electronic apparatus 101 may increase the weighted value of the picture when it is determined that the shape of the object is a front side or lower the weighted value of the picture if it is determined that the shape of the object is a lateral side or rear side.

The weighted value may be determined based on whether the picture is to be shared. When the user shares the picture, sharing information may be included in the picture. The sharing information may include a sharing date/time, a sharing address, and a name of an application used for sharing. The electronic apparatus 101 may extract sharing information from the picture to determine whether to share the picture, and increase the weighted value of the shared picture.

The weighted value of the picture may be determined based on a user interaction. While the user creates a picture and then reproduces the picture, when the user performs a zoom-in or zoom-out operation or flicks the picture, user interaction information may be stored in the picture. The electronic apparatus 101 may extract the user interaction information from a picture stored in the memory 130 and determine a weighted value for the picture. A user interaction may be detected while the picture is being displayed on the screen. For example, when the user displays a picture on the screen to see the picture and performs a zoom-in gesture, the electronic apparatus 101 may detect the user interaction and store the detected user interaction in the picture. If the user interaction is a zoom-in gesture, the weighted value of the picture may be increased. The electronic apparatus 101 may first select pictures of which the calculated weighted value is higher than or equal to a predetermined value using the method as above, and use the selected pictures for fitting use. The various weighted values, such as a shape of an object, whether the picture is to be shared, a user interaction, or other factors may be combined to create a total weight value for the picture.

The electronic apparatus 101 may determine first attribute information and second attribute information from the first selected pictures in operation S1202. The first attribute information of a picture may be information on an object included in the picture. The object may be a user or clothes worn by the user. The electronic apparatus 101 may analyze the picture to identify the user, and extract a style, color, brand, size and other information of the clothes worn by the user. For example, the style attributes of clothes may, as non-limiting examples, include "dress shirt", "formal suit" or "casual". The size attributes of clothes may, as non-limiting examples, include "M", "L", "XL" or "XXL". The second attribute information of a picture may be information on the background of the picture. The background attribute information may, as non-limiting examples, include a location of background, weather, season or context of the picture. For example, the background location of a picture may, as non-limiting examples, include "mountain", "beach" or "downtown". The weather attributes may, as non-limiting examples, include "clear", "cloudy", "raining" or "snowing". The season attributes may, as non-limiting examples, include "spring", "summer", "autumn" or "winter". The context attributes may, as non-limiting examples, include "drinking", "wedding", "climbing a mountain", or "exercising".

The electronic apparatus 101 may store the first attribute information and the second attribute information in the memory 130 in a database form, at operation S1203. The first attribute information and the second attribute information is/are structured, categorized and stored, which is/are retrievable. Also, pictures having the same attributes may be retrieved and clustered.

The electronic apparatus 101 may second select at least one picture from the first selected pictures based on the first attribute information, the second attribute information and user context information, at operation S1204. The user context information may include location information of a user. Also, the user context information may include information on an operational state of the user. For example, the context information may indicate whether the user is shopping, sleeping, going to work or eating.

The electronic apparatus 101 may receive a product image corresponding to the second selected picture from the server 106, at operation S1205. The second selected picture may be used to create a composite image.

The product image may, for example, be an image of clothes provided by a third party. The product image may be selected based on information on a picture for fitting use provided by the electronic apparatus 101. The electronic apparatus 101 may, when the user is in a particular location or performs a particular action, select a picture for fitting use corresponding to a user's context, and provide attribute information of the picture for fitting use to the server 106 or to the display apparatus 102.

In operation S1206, the electronic apparatus 101 may synthesize the second selected picture and the product image to create a composite image. The operation of generating a composite image may be performed in the electronic apparatus 101, in the server 106, or in the display apparatus 102.

The electronic apparatus 101 may display the created composite image in the electronic apparatus. In addition, the created composite image may be displayed in the display apparatus 102.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for generating a composite image by an electronic apparatus, the method comprising:
   storing a plurality of pictures and attribute information related to each of the plurality of pictures;
   identifying, based on a user interaction, one or more pictures among the plurality of pictures;
   identifying a picture, among the identified one or more pictures, based on the attribute information related to the identified picture and user information including information regarding a place where a user is currently located;

receiving a product image corresponding to the identified picture from a server; and generating a composite image by synthesizing the identified picture with the product image.

2. The method as claimed in claim 1,
wherein the one or more pictures are identified by a weight value, and
wherein the weighted value is determined based on when the one or more pictures are created.

3. The method as claimed in claim 1,
wherein the one or more pictures are identified by a weight value, and
wherein the weighted value is determined based on a shape of an object included in a picture.

4. The method as claimed in claim 1,
wherein the one or more pictures are identified by a weight value, and
wherein the weighted value is determined based on whether a picture, among the one or more pictures, is shared.

5. The method as claimed in claim 1,
wherein the one or more pictures are identified by a weight value, and
wherein the weighted value is determined based on a user interaction.

6. The method as claimed in claim 5, wherein the user interaction is detected while a picture is displayed on a screen.

7. The method as claimed in claim 6, wherein the weighted value is increased in response to the user interaction being a zoom-in gesture.

8. The method as claimed in claim 1,
wherein the attribute information includes a first attribute information and a second attribute information, and
wherein the first attribute information comprises information on an object included in a picture, among the one or more pictures.

9. The method as claimed in claim 8, wherein the second attribute information comprises information on a background of a picture, among the one or more pictures.

10. The method as claimed in claim 1, wherein the user information includes position information of the user.

11. An apparatus for generating a composite image, the apparatus comprising:
a memory to store a plurality of pictures;
a transceiver to communicate with an external server;
a display to detect a user interaction; and
at least one processor configured to:
control the memory to store the plurality of pictures and attribute information related to each of the plurality of pictures,
identify, based on a user interaction, one or more pictures among the plurality of pictures;
identify a picture, among the identified one or more pictures, based on the attribute information related to the identified picture and user information including information regarding a place where a user is currently located,
receive a product image corresponding to the identified picture from a server, and
generate a composite image by synthesizing the identified picture with the product image.

12. The apparatus as claimed in claim 11,
wherein the one or more pictures are identified by a weight value, and
wherein the weighted value is determined based on when the one or more pictures are created.

13. The apparatus as claimed in claim 11,
wherein the one or more pictures are identified by a weight value, and
wherein the weighted value is determined based on a shape of an object included in a picture.

14. The apparatus as claimed in claim 11,
wherein the one or more pictures are identified by a weight value, and
wherein the weighted value is determined based on whether a picture, among the one or more pictures, is shared.

15. The apparatus as claimed in claim 11, wherein the one or more pictures are identified by a weight value, and the weighted value is determined based on a user interaction.

16. The apparatus as claimed in claim 15, wherein the user interaction is detected while a picture is displayed on a screen.

17. The apparatus as claimed in claim 16, wherein the weighted value is increased in response to the user interaction being a zoom-in gesture.

18. The apparatus as claimed in claim 11,
wherein the attribute information includes a first attribute information and a second attribute information, and
wherein the first attribute information comprises information on an object included in a picture, among the one or more pictures.

19. The apparatus as claimed in claim 18, wherein the second attribute information comprises information on a background of a picture, among the one or more pictures.

20. The apparatus as claimed in claim 11, wherein the user information includes position information of the user.

* * * * *